UNITED STATES PATENT OFFICE.

ANTOINE MARIE FELIX CHEVET, OF ST. JAMES PARISH, LOUISIANA.

IMPROVEMENT IN MAKING SUGAR.

Specification forming part of Letters Patent No. 5,276, dated September 4, 1847.

*To all whom it may concern:*

Be it known that I, ANTOINE MARIE FELIX CHEVET, of the parish of St. James, in the State of Louisiana, have invented a new and Improved Mode of Clarifying or Defecating the Saccharine Juice of Cane, Beet-Root, or Maple-Tree; and I do hereby declare that the following is a full and exact description.

Instead of using powder lime, as in the usual system, I use it combined with the sugar in the state of saccharate of lime, the composition and preparation of that product as well as its properties being indicated in the treatises of chemistry. Then I have nothing to say, except that to the sugar in its nature we can substitute a saccharine juice to any state of concentration, or such as it comes out immediately after its extraction. That body being very dissoluble, I have the advantage to obtain an immediate mixture of the saccharine juice with the agents of defecation. Preliminary experiments make us know the dose we are to use, and we have to stop to the smallest that produces the useful effect. The lime, being combined to the sugar by a very weak affinity, exercises its influence as if it were free, and the defecation is of but one instant. Nevertheless, it is more easily made when warm than cold. After having separated the deposit, or even immediately after the action and in the presence of the deposit, I saturate the lime either by an acid, either by an acidulous salt, or by a neuter salt, and in order that in the result of the reaction there should remain no offensive matter in the sugar, I choose my agents in such a manner that the produce of the reaction might all be indissoluble. If we prefer, we may commence with those agents and after employ the saccharate of lime, the precipitate that is formed at the very bosom of the mass of the liquid having, besides, the advantage to draw by its weight the organic matters in suspension at the bottom of the vessel in which the deposit takes place, and the sugar that was engaged in combination with the lime in the state of saccharate is found free again to be added to that which is contained in the saccharine juice of cane, beet-roots, or maple-tree. I will cite for my agents the sulphurous, sulphuric, and phosphoric acids, the acidulous phosphate of lime, the sulphate of alumina, the alum, the sulphite, the hyposulphite, the hyposulphate, the sulphate of zinc or iron, or every matter producing a reaction established on the same principle—that is to say, that nothing is left in dissolution after the reaction, unless it is the sugar of the saccharate that has been regenerated. If we care not about taking away the lime from the saccharate, and regenerate the sugar, we may do without using any agent after the action of the saccharate.

In order to dose acids, acidulous salts, neuter salts, or whatever agents used further, when we adopt the whole method we calculate by the tables of the proportional numbers, or of the chemical equivalents, in the usual manner; and in using the method used and described in the most part of treatises of chemistry for the alcalimetric experiments, by taking for a foundation the quantity of lime introduced by the saccharate, and which we intend to precipitate.

What I claim as my invention is—

The employment of soluble saccharate of lime, instead of the lime in its native state, and the employment of an agent which may take off the lime after its action without leaving anything soluble in the saccharine liquor.

Parish of St. James, November 23, 1846.

CHEVET.

Witnesses:
P. LANDREAUX,
SAMUEL FAYOT.